United States Patent Office 3,055,479
Patented Sept. 25, 1962

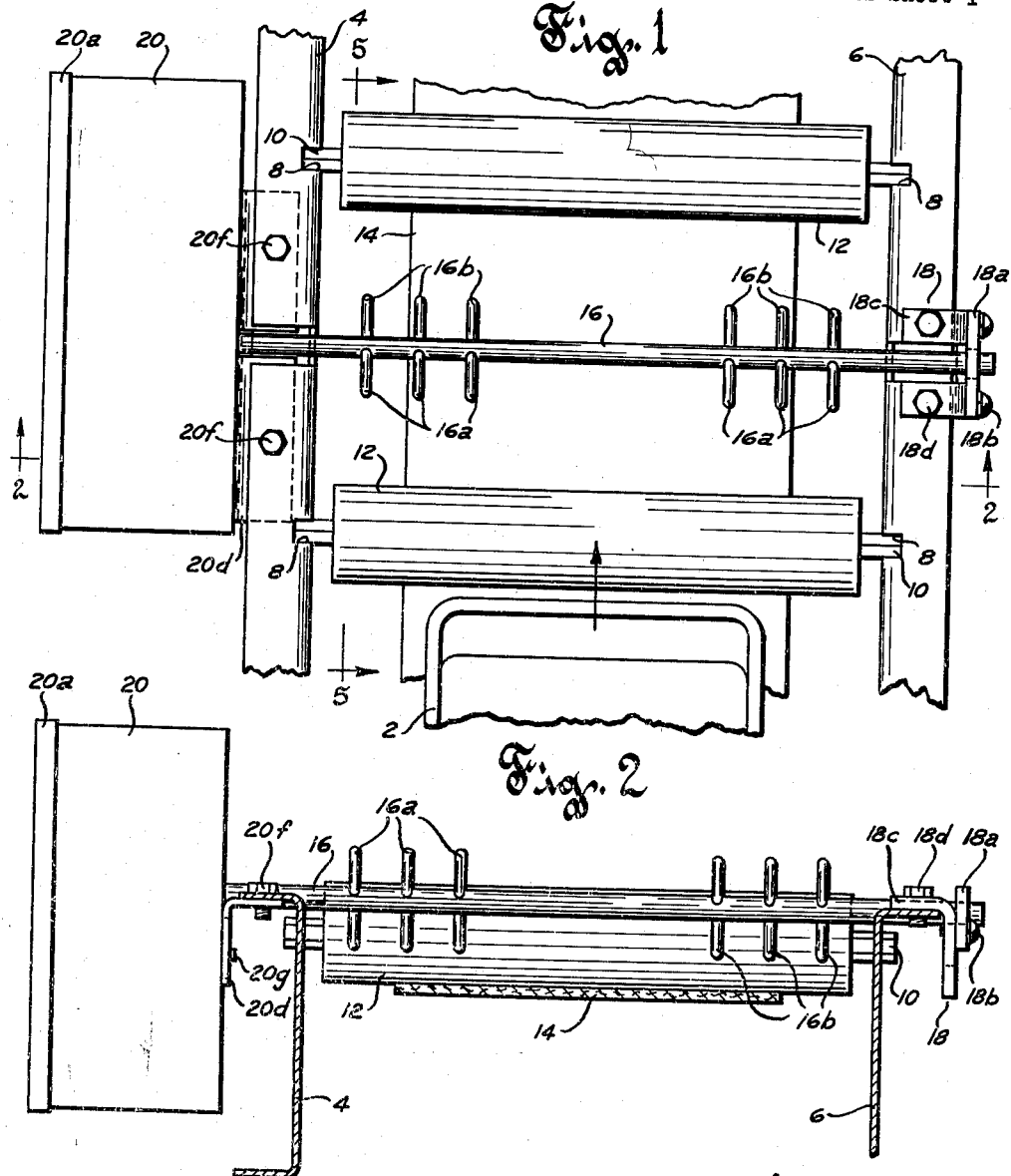

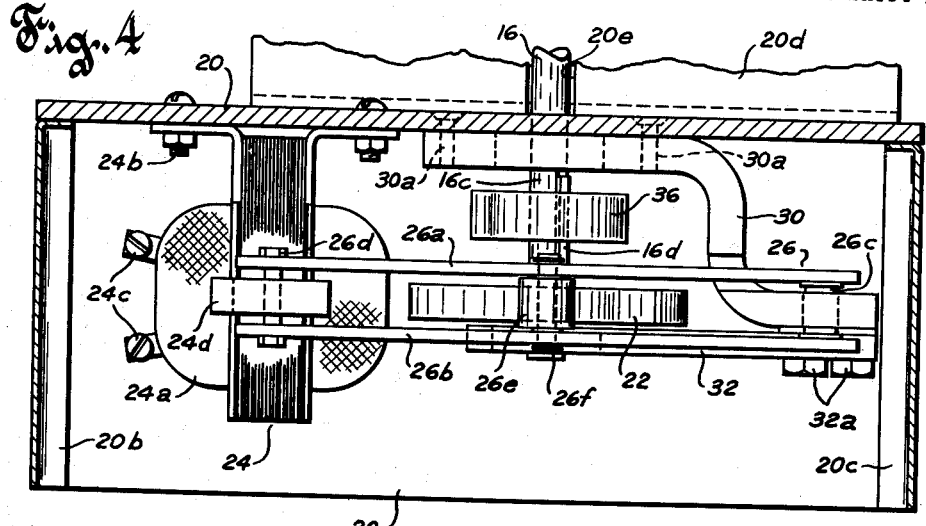
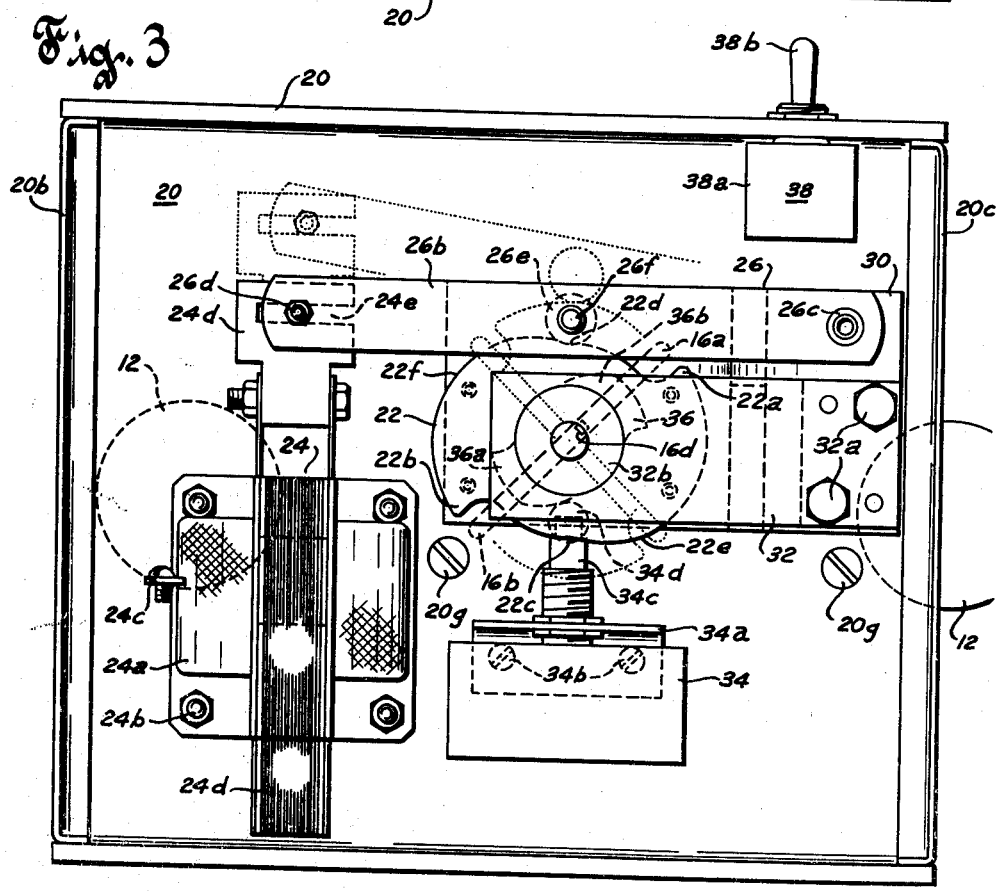

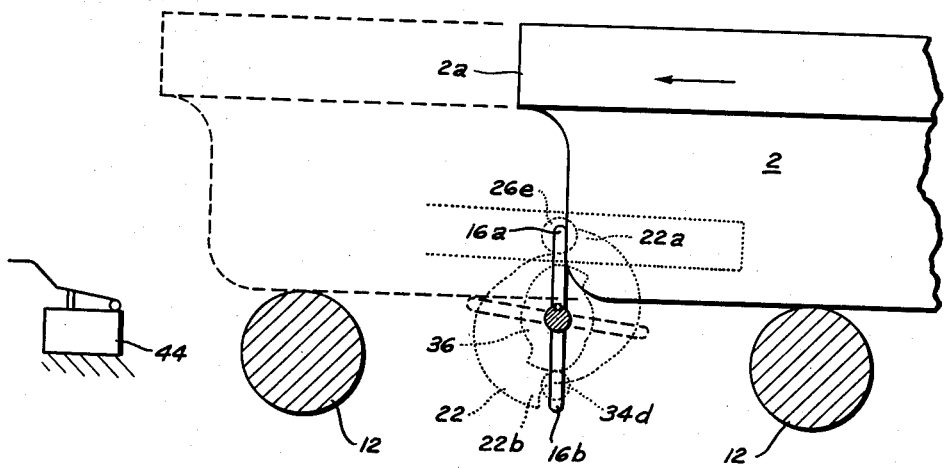
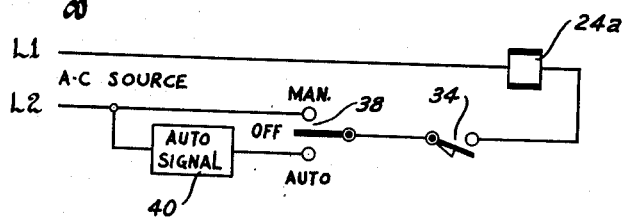
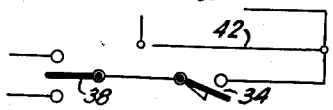
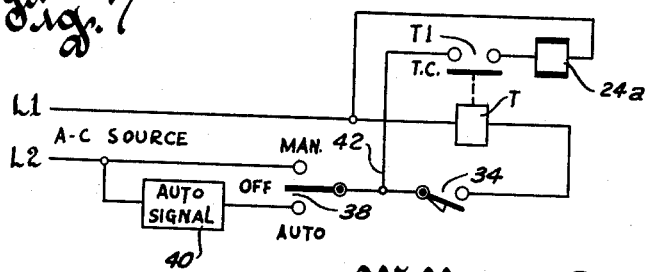
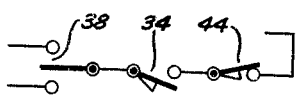

3,055,479
ARTICLE CONVEYOR
William D. Brand, Wauwatosa, Richard J. Byrnes, West Allis, and Harold S. Montgomery, Milwaukee, Wis., assignors to Cutler-Hammer, Inc., Milwaukee, Wis., a corporation of Delaware
Filed Mar. 14, 1960, Ser. No. 14,906
20 Claims. (Cl. 198—34)

This invention relates to an article conveyor and more particularly to a stop mechanism therefor.

While not limited thereto, the invention is especially applicable to belt conveyors and to roller conveyors of the belt driven type or the like for stopping the thing being conveyed such as an article or article carrier and for restarting the same for travel along the conveyor. The invention also finds utility in interrupting, for a selected time interval, the movement of each article of a series thereof being conveyed to space the articles along the conveyor.

An object of the invention is to provide improved article stopping means for a conveyor.

A more specific object of the invention is to provide improved means for stopping one or more articles being conveyed along a conveyor and for releasing the same in a controlled manner for further movement along the conveyor.

Another specific object of the invention is to provide an improved article stopping mechanism which is capable of stopping a selected number of articles of a series thereof being conveyed along a conveyor in immediately adjacent relation.

A further specific object of the invention is to provide an improved article stopping device which can be readily mounted in place of a conveyor roller or between adjacent rollers at any desired point along a roller conveyor.

Another object of the invention is to provide improved means capable of spacing articles of a series thereof either by manual or automatic control while being conveyed along a conveyor equal or selectively different distances apart as desired.

Another object of the invention is to provide an improved article or tray stop for a conveyor which employs a latch having a substantially frictionless release mechanism whereby minimum electromagnetic force is required to release one or more articles or trays which have been stopped.

Other objects and advantages of the invention will hereinafter appear.

While the apparatus hereinafter described is effectively adapted to fulfill the objects stated, we do not intend to confine our invention to the particular preferred embodiment of stopping mechanism disclosed, inasmuch as it is susceptible of various modifications without departing from the scope of the appended claims.

The invention will now be described in detail with reference to the accompanying drawings, wherein:

FIGURE 1 is a top view of an article conveyor and stopping mechanism constructed in accordance with the invention;

FIG. 2 is a cross sectional view taken along line 2—2 of FIG. 1 showing the stopping mechanism in front elevation;

FIG. 3 is an end view of the stopping mechanism of FIG. 1 showing the operating mechanism therefor;

FIG. 4 is a top view of the operating mechanism of FIG. 3;

FIG. 5 is a cross sectional view taken along line 5—5 of FIG. 1 showing the tray in stopped position;

FIG. 6 is a circuit diagram for controlling the operating mechanism of FIGS. 3 and 4;

FIG. 7 is a circuit diagram affording timed control of the operating mechanism of FIGS. 3 and 4;

FIG. 8 is a fragmentary circuit showing a modification of the circuits of FIGS. 6 and 7; and FIG. 9 is a fragmentary circuit showing a modification of the circuit of FIG. 7.

Referring to FIG. 1, there is shown a conveyor of the belt driven roller type adapted for conveying an article or article carrier such as, for example, a tray 2 or the like. The conveyor is provided with a pair of generally shallow U-shaped frame or support members 4 and 6 arranged on edge with the bottoms of the U-shaped members arranged in opposed relation to form side rails for the conveyor. The upper, inner corners of support members 4 and 6 are provided with equally spaced notches 8, each notch on member 4 being in lateral alinement with a corresponding notch on member 6 and each such pair of alined notches being adapted to accommodate and securely support the ends of an axle 10 of a conveyor roller 12. The ends of axle 10 are of hexagonal cross section or may be provided with suitable flat or partially flat sides to be held against rotation in their associated notches 8 whereas roller 12 is mounted for free rotation on the axle. It will be apparent that rollers 12 are held in their respective positions by gravity and that each such roller may be freely lifted from its notches if it is desired to remove the same. Rollers 12 are frictionally driven by an endless motor driven belt 14. In conveyors of this type, a plurality of idler rollers, not shown, are mounted below belt 14 and these idler rollers are staggered relative to rollers 12 to bias belt 14 into frictional engagement with rollers 12.

The conveyor is provided with a stop mechanism, shown in FIGS. 1 and 2, for stopping one or more trays 2 as they travel along the conveyor while the stopping mechanism is shown mounted in place of a conveyor roller which has been removed. It will be apparent that it could as well be mounted between a pair of conveyor rollers. The stopping mechanism consists of a rotary shaft 16 arranged laterally across the conveyor and having intermediate its ends two spaced groups of pin-like stopping members extending in opposite directions therefrom, the portions of these members extending in opposite directions being indicated as 16a and 16b. Each member 16a and 16b is rigidly secured at one end thereof to shaft 16, or, as will be apparent, a single pin member may be inserted in and rigidly secured in each round hole extending through shaft 16 with the opposite ends of each such pin member extending an equal distance in opposite directions from the shaft. As shown in FIG. 2, rotary shaft 16 is mounted in place of one roller on a conveyor so that it is slightly below the upper level of the adjacent conveyor rollers and does not interfere with the passage of trays 2 thereover. The right-hand end of shaft 16 is supported on the conveyor by a bracket 18. Bracket 18 consists of a vertical plate-like member 18a having a hole therethrough for rotatably accommodating the right-hand end of shaft 16. Member 18a is secured by a pair of screws 18b or the like to a supporting member 18c. Member 18c is U-shaped with the legs thereof bent at a right angle to overlie the upper flange of conveyor support member 6 and these bent portions are secured to such upper flange by a pair of screws 18d or the like. The left-hand end of shaft 16 is journaled in a suitable hole in a U-shaped housing member 20 having a cover 20a shown in FIG. 1 and the opposite ends of which are closed by plates 20b and 20c shown in FIGS. 3 and 4. Housing member 20 is more clearly shown in FIG. 3 wherein cover 20a is removed and in FIG. 4 wherein cover 20a and the upper leg of U-shaped housing member 20 is removed. Member 20 is rigidly secured at its yoke portion to conveyor supporting member 4 by a bracket 20d having a central slot 20e (FIG. 4) in its horizontal portion to clear shaft 16. Bracket 20d is secured to the upper flange of conveyor supporting member 4 on the lower side of the latter by suitable screws 20f or the like and to the midportion of housing member 20 by screws 20g or the like.

As more clearly shown in FIGS. 3 and 4, one end portion 16c of shaft 16 extends through and beyond housing member 20. The operating mechanism for controlling rotation of shaft 16 and the stopping action of stopping pin members 16a and 16b secured thereto is mounted on the opposite side of housing member 20 from the conveyor. This stopping mechanism comprises a cam 22 rigidly secured by a key 16d to end portion 16c of the shaft. Cam 22 is provided with two stopping teeth 22a and 22b oppositely disposed therearound 180 degrees relative to one another. Substantially 45 degrees ahead of each such stopping tooth there is provided a low portion or valley 22c and 22d on the cam defining the normal resting position of the operating mechanism shown in FIG. 3 and hereinafter described. A declining surface 22e and 22f extends from each tooth to its associated valley 22c and 22d for resetting the stopping mechanism as hereinafter described. An electromagnet having a magnetic frame 24 and a solenoid 24a is mounted by bolts 24b or the like onto housing member 20 at one side of cam 22. Solenoid 24a is provided with a pair of terminals 24c for connection to an electrical source. The electromagnet is provided with a vertical plunger 24d having at its upper end a horizontal open slot 24e for connection with a pivotal device 26, slot 24e affording clearance for translation between the linear reciprocatory motion of plunger 24d and the rotary motion of pivotal device 26. Pivotal device 26 consists of a pair of elongated members 26a and 26b in spaced parallel arrangement. Members 26a and 26b are secured to one another at the right-hand ends thereof by a transverse pin 26c or the like entering at its ends into holes in the respective members. Members 26a and 26b are secured to one another at the left-hand ends thereof by a transverse bolt 26d or the like extending through holes in the respective members. A generally Z-shaped supporting bracket 30 is secured along one straight end portion to housing member 20 by screws 30a or the like. The other parallel straight end portion of bracket 30 is offset from plate 20 and is provided with a hole for accommodating pin 26c to pivotally support device 26 on the bracket. A roller type cam follower 26e is mounted on a pin 26f extending through alined holes in members 26a and 26b at substantially the midportions of the latter, such follower cooperating with cam 22.

A horizontally extending supporting member 32 is secured at one end thereof to the aforementioned other parallel straight end portion of bracket 30 below pin 26c by a pair of screws 32a or the like. Member 32 extends in the left-hand direction as seen in FIGS. 3 and 4 and is provided at its other end with an aperture accommodating a bearing 32b for rotatably supporting the end of shaft 16.

A limit switch 34 is mounted below cam 22 on a relatively wide L-shaped bracket 34a which is secured to housing member 20 by bolts 34b or the like. Limit switch 34 is provided with a plunger type vertical actuator 34c having a roller 34d on the upper end thereof for cooperation with a cam 36. Cam 36 is rigidly secured by key 16d or the like to the end portion of shaft 16 between cam 22 and housing member 20. Cam 36 is provided with a pair of operating projections 36a and 36b oppositely disposed 180 degrees apart, these operating projections being substantially in line with the oppositely disposed stopping members 16a and 16b shown in dotted lines in FIG. 3.

A manually operable switch 38 of the double-throw toggle lever type is mounted at the top of housing member 20 as shown in FIG. 3, this switch also being shown in the circuit diagrams in FIGS. 6 and 7. Switch 38 is provided with a switch enclosing housing 38a within housing member 20 and a toggle lever 38b extending through housing member 20 and thereabove. Switch 38 is employed for transferring the tray stopping mechanism between manual and automatic operation as hereinafter described.

The operation of the stopping mechanism will now be described. Let it be assumed that a tray is moving along the conveyor in the direction indicated by the arrow in FIG. 1 and in the left-hand direction in FIGS. 3 and 5. As the tray approaches the stopping mechanism, the forward end thereof strikes stopping pins 16a and rotates the stopping mechanism from the inclined position shown in FIG. 3 to a position substantially 45 degrees therefrom shown in FIG. 5 wherein stopping member 16a is vertical. In this position, tooth 22a of cam 22 stops against roller 26e to stop rotation of the stopping mechanism. As a result, tray 2 is stopped although conveyor rollers 12 continue rotating under the bottom of the tray.

When is is desired to release the tray for continued travel along the conveyor, solenoid 24a is energized to raise plunger 24d. This causes clockwise rotation of pivotal device 26 on its pivot pin 26c whereby roller 26e rolls off tooth 22a of cam 22 to release the stopping mechanism. It will be apparent that this action, that is, the coaction between roller 26e and tooth 22a is essentially frictionless. Therefore, a relatively low power solenoid 24a can be used. The power required to raise the left-hand end of pivotal device 26 as seen in FIG. 3 to release the stopping mechanism is substantially the same whether one tray is stopped or whether a plurality of trays in series abutting engagement are stopped against stopping pins 16a. When the trays are stopped they continue to be driven by the conveyor rollers rotating thereunder. Thus, when the stopping mechanism is released, the conveyor rollers immediately initiate further travel of the trays past the stopping position.

The trays are preferably constructed as shown in FIG. 5, each having upper edges 2a which extend forwardly and rearwardly therefrom. When a series of trays are stopped, the rear upper edge of each tray abuts the forward upper edge of the succeeding tray thereby to afford space between the bottoms of the trays. This space permits the release of one tray of a series and to stop the succeeding tray as hereinafter more fully described.

Referring to FIG. 3, it will be seen that when a tray approaches the stopping mechanism and rotates stopping pins 16a counterclockwise to their vertical position, projection 36a of cam 36 depresses plunger actuator 34c of limit switch 34 to close the contacts of the latter. The function of this limit switch is to operate a circuit to release the stopping mechanism.

One such circuit is shown in FIG. 6. As shown therein, solenoid 24a and normally open limit switch 34 are connectable in series across lines L1 and L2, when switch 38 is turned to its manual operating position, lines L1 and L2 being connectable in a suitable manner to an electrical power supply source. When a tray rotates stopping pins 16a to their vertical position, limit switch 34 closes to energize solenoid 24a. As a result, roller 26e releases tooth 22a whereupon the driven tray pushes on pins 16a to rotate the same further. Rollers 34d of plunger actuator 34c rolls off projection 36a of cam 36 to cause reopening of the limit switch under the force of its return spring. This deenergizes solenoid 24a and the weight of pivotal device 26 and plunger 24d causes roller 26e to roll along declining surface 22e of cam 22 and rotate the latter unit it stops with roller 26e in low portion 22c of the cam. This is the other normal position of the stopping mechanism. In this position, the stopping mechanism has rotated 180 degrees and stopping pins 16b are now in inclined position to engage the succeeding tray. When a series of trays have been stopped, the aforementioned space therebetween is sufficient to allow pins 16b to rise between the trays and stop the next tray. While the circuit shown in FIG. 6 operates in response to stopping of a tray to immediately release such tray, it will be apparent that this circuit may be employed to afford limited spacing between trays. The length of time that each tray is stopped is determined by the operating time of the circuit including the operating time of solenoid 24a to release each tray. When switch 38 is turned to its AUTO operating position, automatic signalling device 40 controls release of the tray following stopping thereof and closure of limit switch 34.

For manual control of the spacing of a series of trays, switch 38 in FIG. 6 is normally opened after the first tray has been released. The next tray is then stopped by the stopping mechanism. When the first tray has moved a desired distance along the conveyor, switch 38 is manually closed whereupon the second tray is released. Switch 38 is preferably provided for this operation with a spring which returns the switch from MAN. to OFF position when toggle lever 38b, FIG. 3, is released. With this construction, the toggle lever need only be moved to MAN. position and released to release each succeeding tray.

Referring to FIG. 7, there is shown a modified circuit for operating the stopping mechanism under the control of limit switch 34. In this circuit, normally open limit switch 34 is connectable in series with the operating element such as a coil of a timer T across lines L1 and L2, when switch 38 is turned to its MANUAL operating position, lines L1 and L2 being connectable in a suitable manner across an electrical power supply source. Timer T is provided with a normally open contact T1 which is connected in series with solenoid 24a and switch 38 across lines L1 and L2.

When a tray is stopped and limit switch 34 closes as hereinbefore described, timer T is energized. After a predetermined time interval depending on the setting of timer T, contact T1 closes, this contact being timed closing as indicated by T.C. adjacent thereto. Closure of contact T1 causes energization of solenoid 24a to release the tray. When the tray is released, limit switch 34 opens to deenergize timer T. This causes immediate reopening of contact T1 to deenergize solenoid 24a thereby to allow the stopping mechanism to automatically reset and to engage the next tray. Thus, the trays are spaced by predetermined amounts along the conveyor and the spacing therebetween is determined and adjusted by adjusting the operating time of timer T. When switch 38 is turned to its AUTO operating position, timer T is maintained deenergized although limit switch 34 closes until automatic signaling apparatus 40 connects power to the timer. In this position of selector switch 38, the release of each tray is under the control of apparatus 40.

Alternatively, limit switch 34 may also be connected in series with contact T1 and solenoid 24a as shown in FIG. 9 instead of connecting contact T1 directly to switch 38. With this arrangement and with connection 42 disconnected from the left-hand side of limit switch 34 and connected to the right-hand side thereof as shown in FIG. 9, closure of limit switch 34 energizes timer T and contact T1 closes after a predetermined time interval to energize solenoid 24a and release the tray. When the tray is released, limit switch 34 opens to deenergize timer T and open contact T1 to deenergize solenoid 24a. The connection of limit switch 34 in series with contact T1 is a safety measure whereby solenoid 24a is deenergized by limit switch 34 even if contact T1 fails to open properly as by being welded upon closing. Deenergization of solenoid 24a is necessary to enable the stopping mechanism to engage the next tray.

Referring to FIG. 8, there is shown a modification which may be incorporated either in the circuit of FIG. 6 or the circuit of FIG. 7. This modification consists of connecting a normally closed limit switch 44, in series with normally open limit switch 34. This limit switch may be mounted on the conveyor between a pair of rollers a selected distance beyond the stopping mechanism depending upon the spacing desired between a series of trays. The selected distance must be less than the length of one tray or limit switch 34 will be re-closed by the following tray (if trays are abutting) before limit switch 44 is opened by the released tray. If spacing greater than one tray length is desired, a plurality of limit switches 44 may be used, each spaced slightly less than the length of one tray from the adjacent limit switch. With this modification, the circuit shown in FIG. 6, for example, would operate in the following manner. The stopping mechanism functions as hereinbefore described to stop the first tray and to release the same upon the closure of limit switch 34. The first tray moves along the conveyor and engages limit switch 44 to open the same. The stopping mechanism then acts to stop the next tray while the first tray continues moving along the conveyor. When the trailing end of the first tray passes over limit switch 44 to release the same, the latter closes to energize solenoid 24a and release the next tray. Thus, the series of trays are automatically spaced along the conveyor.

An essential feature of the invention is the provision of an improved stopping mechanism which is efficient and reliable in operation and which is adjustable to afford selective spacing of trays along the conveyor. Another feature resides in that the improved stopping mechanism is capable of stopping a plurality of trays and further is capable of releasing the first of subsequent trays without subjecting the solenoid to overload conditions. Certain prior tray stops had the disadvantage that the greater the number of trays that were stopped, the greater the force that was required to release the same. This invention overcomes this disadvantage in providing a positive stop when tooth 22a or 22b engages roller 26e and further providing an essentially frictionless release when roller 26e rolls off such tooth. This avoids overloading the solenoid. Moreover, the rotary nature of the stopping mechanism decreases to a minimum the work required for its solenoid to operate. And this rotary feature also affords resetting the mechanism under the force of gravity for engaging the next tray. Also, the stopping pins 16a and 16b may space along shaft 16 so that the stopping mechanism can be used on a belt type conveyor, the belt running between the groups of stopping pins.

It will be apparent that cams 22 and 36 are reversible on shaft 16 so that the stopping mechanism can also be employed for stopping trays approaching the same from the left-hand direction as seen in FIG. 3.

We claim:

1. In a conveyor of the driven roller type for conveying articles therealong and having a plurality of article supporting and conveying rollers spaced longitudinally thereof, the improvement comprising a stopping mechanism mounted at a desired point along the conveyor in place of one of the conveyor rollers, said stopping mechanism comprising a rotary shaft mounted transversely of the conveyor in place of a conveyor roller between and slightly below the upper level of the adjacent rollers, a plurality of stopping members extending in opposite directions from the axis of said shaft, certain of said stopping members normally extending at a predetermined angle above the upper level of the adjacent conveyor rollers and into the path of movement of the article to engage the same, a latch normally restricting rotary movement of said shaft so that said certain stopping members do not move beyond their vertical position when they are engaged by a tray, and power operated means for releasing said latch to afford free rotation of said shaft whereby the article pushes said stopping members into a horizontal position and travels thereover along the conveyor.

2. The invention defined in claim 1, wherein said latch comprises a cam mounted on one end of said shaft, said cam having a pair of teeth and the teeth of said pair being oppositely disposed, and a movable member normally in the path of and engageable by one of said teeth when one of said stopping members is in a vertical position to prevent further rotation of said shaft, and said power operated means being effective to move said moveable member to disengage the corresponding tooth thereby to allow free rotation of said shaft.

3. The invention defined in claim 2, wherein said power operated means comprises an electroresponsive coil and an armature responsive to energization of said coil for moving said movable member, and means responsive to initial movement of one of said stopping members into its vertical position for energizing said coil.

4. The invention defined in claim 2, wherein said movable member comprises a longitudinal member pivoted at one end and operatively connected to said power operated means at the other end, said member having a portion intermediate the ends thereof for engagement with one of said teeth.

5. The invention defined in claim 4, wherein said intermediate portion is provided with a roller for engaging said one tooth, said roller affording substantially frictionless disengagement thereof from said tooth when said power operated means is operated to pivot said longitudinal member.

6. The invention defined in claim 2, wherein said power operated means comprises an electroresponsive coil and an armature, said armature being responsive to energization of said coil for moving said movable member, and means responsive to initial movement of one of said stopping members into its vertical position by the article for energizing said coil after a predetermined time interval.

7. The invention defined in claim 2, wherein said cam is reversible on said shaft and reversing of said cam renders said stopping mechanism effective to stop an article traveling in the other direction along the conveyor.

8. The invention defined in claim 2, wherein said energizing means comprises a limit switch, and an actuator responsive to initial movement of one of said stopping members into its vertical position by the article for closing said limit switch to energize said coil, said actuator being responsive to further movement of said one stopping member beyond its vertical position following energization of said coil for reopening said limit switch to deenergize said coil.

9. The invention defined in claim 6, wherein said means for energizing said coil after a time interval comprises a limit switch, an actuator responsive to initial movement of one of said stopping members into its vertical position by the article for closing said limit switch, a timer, said limit switch being effective to complete a circuit when closed to initiate operation of said timer, and a contact operable after a predetermined time interval responsive to operation of said timer to complete an energizing circuit for said coil.

10. The invention defined in claim 9, wherein said actuator is provided with means responsive to further movement of said stopping members beyond their vertical position following release of said latch for reopening said limit switch to deenergize said timer, said timer when deenergized causing reopening of said contact to deenergize said coil.

11. The invention defined in claim 10, wherein said limit switch is connected in series with said contact and said coil so that said limit switch when opened will deenergize said coil even if said contact fails to open.

12. The invention defined in claim 8, together with a second limit switch mounted on the conveyor and operable by a first article to maintain said coil deenergized thereby to maintain the next article stopped until the first article has passed beyond said second limit switch.

13. In a conveyor of the driven roller type for conveying trays therealong and having a plurality of transverse tray supporting and conveying rollers spaced longitudinally thereof, the improvement comprising a stopping mechanism mounted at a desired point along the conveyor, said stopping mechanism comprising a rotary shaft mounted transversely of the conveyor between and slightly below the upper level of the adjacent rollers, stopping members rigidly secured intermediate the ends of and extending in opposite directions from the axis of said shaft, certain of said members normally extending above the upper level of the adjacent rollers into the path of movement of the tray for engaging the same and being inclined from the vertical toward the approaching tray at an angle of substantially forty-five degrees, a latch normally restricting rotary movement of said shaft so that said inclined stopping members cannot rotate beyond this vertical position when they are struck by an approaching tray, said latch comprising a cam having a pair of teeth with the respective teeth of said pair thereof disposed one hundred eighty degrees relative to one another around said cam, said latch further comprising a movable member having a roller follower mounted thereon for cooperation with said cam and normally engaging the same under the force of gravity means rigidly securing said cam to an end of said shaft in a disposition wherein one of said teeth engages said roller follower when the associated stopping members are in their vertical position, such engagement between said one tooth and said roller follower preventing further rotation of said shaft thereby to stop the tray against said vertical stopping members, electroresponsive means energizable for moving said movable member to cause said roller follower to roll off said tooth thereby to enable the tray to rotate said vertical stopping members out of its path into a horizontal position, means for deenergizing said electroresponsive means to cause said roller follower to reengage said cam under the force of gravity, and said cam having a declining surface extending from each said tooth terminating in a valley spaced by a predetermined angle from the other tooth, said roller follower acting under the force of gravity on said declining surface to rotate said cam after the tray has passed over said one stopping member until said roller follower stops in said valley on said cam whereby the other stopping members assume the inclined position in the path of the next tray.

14. The invention defined in claim 13, wherein each tray is provided with horizontally extending forward and rear upper edges to afford a space between the bottoms of the trays when the rear end of one tray abuts the forward end of the next tray on the conveyor, such space affording clearance to allow said other stopping members to be rotated into their inclined position above the level of the adjacent conveyor rollers as soon as said one tray has passed over the stopping mechanism.

15. The invention defined in claim 13, together with means responsive to rotation of said stopping members from their inclined position to their vertical position when struck by a tray for energizing said electroresponsive means.

16. In a conveyor for conveying and supporting flat bottom articles therealong, a rotary stopping mechanism mounted transversely of the conveyor, said stopping mechanism being normally effective to engage the leading end of and stop an article to prevent passage thereof beyond said mechanism, electroresponsive means for operating said mechanism to release the article thereby to allow the latter to rotate said mechanism out of its path and permit movement of the article further along the conveyor, and means operating following disengagement of said stopping mechanism by the bottom of the article to rotate said stopping mechanism further in the same direction into a reset position wherein it is effective to stop the next article.

17. In a conveyor for conveying articles therealong, a rotary stopping mechanism mounted transversely of the conveyor, said stopping mechanism being normally effective to engage and stop an article to prevent passage thereof beyond said mechanism, electroresponsive means for operating said mechanism to release the article thereby to allow the latter to rotate said mechanism out of its path and permit movement of the article further along the conveyor, and gravity operated means for resetting said stopping mechanism by further rotation thereof following passage of an article thereover to stop the next article moving along the conveyor.

18. In a conveyor for conveying articles therealong, a rotary stopping mechanism mounted transversely of the conveyor, means normally latching said stopping mechanism to render the same effective to engage and stop an article to prevent passage thereof beyond said mechanism, electroresponsive means for operating said latching means to unlatch said mechanism whereby the article rotates said stopping mechanism out of its path to allow movement of the article further along the conveyor, and said latching means comprising means responsive to deenergization of said electroresponsive means for causing rotation of said stopping mechanism to a reset position thereby to render said stopping mechanism effective to stop the next article.

19. In a conveyor for conveying articles therealong, a rotary stopping mechanism mounted transversely of the conveyor, means normally latching said stopping mechanism to render the same effective to engage and stop an article to prevent passage thereof beyond said mechanism, electroresponsive means for operating said latching means to unlatch said mechanism whereby the article rotates said stopping mechanism out of its path to allow movement of the article further along the conveyor, and means responsive to stopping of the article for energizing said electroresponsive means.

20. In a conveyor for conveying articles therealong, a rotary stopping mechanism mounted transversely of the conveyor, means normally latching said stopping mechanism to render the same effective to engage and stop an article to prevent passage thereof beyond said mechanism, electroresponsive means for operating said latching means to unlatch said mechanism whereby the article rotates said stopping mechanism out of its path to allow movement of the article further along the conveyor, automatic signalling means, and a limit switch operable by said mechanism in response to stopping of an article for placing control of the release of said latching means under the control of said automatic signalling means.

References Cited in the file of this patent

UNITED STATES PATENTS

| | | |
|---|---|---|
| 1,461,465 | Stebler | July 10, 1923 |
| 2,748,695 | Whitecar | June 5, 1956 |
| 2,801,725 | Sindzinski | Aug. 6, 1957 |

FOREIGN PATENTS

| | | |
|---|---|---|
| 882,670 | Germany | July 9, 1953 |